(12) United States Patent
Job et al.

(10) Patent No.: US 12,427,913 B2
(45) Date of Patent: Sep. 30, 2025

(54) TRAILER SYSTEM AND METHOD FOR MODULATING SIGNALS FROM A VEHICLE TO A TRAILER

(71) Applicants: Richard W. Job, Ankeny, IA (US); Aidan Jerome Doruska, Jacksonville, FL (US)

(72) Inventors: Richard W. Job, Ankeny, IA (US); Aidan Jerome Doruska, Jacksonville, FL (US)

(*) Notice: Subject to any disclaimer, the term of this patent is extended or adjusted under 35 U.S.C. 154(b) by 56 days.

(21) Appl. No.: 18/441,381

(22) Filed: Feb. 14, 2024

(65) Prior Publication Data
US 2025/0256640 A1     Aug. 14, 2025

(51) Int. Cl.
*B60Q 1/50*    (2006.01)
*B60Q 1/30*    (2006.01)
*B60Q 1/44*    (2006.01)

(52) U.S. Cl.
CPC .............. *B60Q 1/44* (2013.01); *B60Q 1/305* (2013.01)

(58) Field of Classification Search
CPC .................. B60Q 1/44; B60Q 1/305
USPC ........................................... 340/467
See application file for complete search history.

(56) References Cited

U.S. PATENT DOCUMENTS

| | | | |
|---|---|---|---|
| 5,397,924 A * | 3/1995 | Gee ............ | B60D 1/62 340/3.1 |
| 7,435,093 B1 * | 10/2008 | Harmon ........ | H01R 31/02 439/35 |
| 2019/0315320 A1 * | 10/2019 | Maat .......... | B60T 7/20 |
| 2020/0338941 A1 * | 10/2020 | Slade .......... | B60R 16/0239 |
| 2025/0010799 A1 * | 1/2025 | Lepage ......... | H04N 7/181 |

* cited by examiner

*Primary Examiner* — Tai T Nguyen
(74) *Attorney, Agent, or Firm* — Brett J. Trout (57) ABSTRACT

A system for transmitting lighting signals from a vehicle to agricultural equipment being towed by the vehicle. An improved trailer lighting system and method uses an improved wiring harness converts output from a standard 7-pin vehicle connector for use in activating agricultural equipment lights through a standard 7-pin agricultural equipment lighting connector. When the vehicle brakes, the harness recognizes increased voltage flowing through the turn signal connectors of the vehicle and activates the brake lights of the trailer in response.

20 Claims, 9 Drawing Sheets

VEHICLE INPUT AND TRAILER LIGHT OUTPUT FROM HARNESS

| | VOLTAGE | CHIP INPUT CONNECTION | VOLTAGE | CHIP OUTPUT CONNECTION | VOLTAGE | RELAY | VOLTAGE | TRAILER-S279 PIN | LIGHT | TRAILER LIGHTS |
|---|---|---|---|---|---|---|---|---|---|---|
| VEHICLE TRAVELING DOWN THE ROAD | | | | | | | | | | |
| YELLOW LEFT TURN CONNECTOR-16 | 2.5 | 62 | 5 | 70 | 5 | 68 | 12 | YELLOW LEFT TURN CONNECTOR-36 | LEFT TURN SIGNAL | OFF |
| GREEN RIGHT TURN CONNECTOR-22 | 2.5 | 66 | 5 | 78 | 5 | 76 | 12 | GREEN RIGHT TURN CONNECTOR-40 | RIGHT TURN SIGNAL | OFF |
| | | | | | | 72 | 0 | RED BRAKE CONNECTOR-38 | HAZARD LIGHTS | ON |
| | | 100 | <2 | 74 | 0 | 72 | 0 | RED BRAKE CONNECTOR-38 | BRAKE LIGHT | OFF |
| | | | | 82 | 5 | 80 | 12 | BROWN TAIL LIGHT CONNECTOR-42 | TAIL LIGHT | ON |
| VEHICLE MAKING A RIGHT TURN | | | | | | | | | | |
| YELLOW LEFT TURN CONNECTOR-16 | 2.5 | 62 | 5 | 70 | 5 | 68 | 12 | YELLOW LEFT TURN CONNECTOR-36 | LEFT TURN SIGNAL | OFF |
| GREEN RIGHT TURN CONNECTOR-26 | 2.5 FLASHING | 66 | 5 FLASHING | 78 | 5 FLASHING+ | 76 | 12 FLASHING+ | GREEN RIGHT TURN CONNECTOR-40 | RIGHT TURN SIGNAL | ON FLASHING+ |
| | | | | | | | | | HAZARD LIGHTS | RIGHT ON FLASHING+; LEFT ON |
| | | 100 | <2 | 74 | 0 | 72 | 0 | RED BRAKE CONNECTOR-38 | BRAKE LIGHT | OFF |
| | | | | 82 | 5 | 80 | 12 | BROWN TAIL LIGHT CONNECTOR-42 | TAIL LIGHT | LEFT ON STEADY, RIGHT FLASHING+ |
| VEHICLE MAKING A LEFT TURN | | | | | | | | | | |
| YELLOW LEFT TURN CONNECTOR-16 | 2.5 FLASHING | 62 | 5 FLASHING | 70 | 5 FLASHING+ | 68 | 12 FLASHING + | YELLOW LEFT TURN CONNECTOR-36 | LEFT TURN SIGNAL | LEFT ON FLASHING+ |
| GREEN RIGHT TURN CONNECTOR-26 | 2.5 | 66 | 5 | 78 | 5 | 76 | 12 | GREEN RIGHT TURN CONNECTOR-40 | HAZARD LIGHTS | LEFT ON FLASHING+; RIGHT ON |
| | | | | | | 72 | 0 | RED BRAKE CONNECTOR-38 | RIGHT TURN SIGNAL | OFF |
| | | 100 | >2 | 74 | 0 | 72 | 0 | RED BRAKE CONNECTOR-38 | BRAKE LIGHT | OFF |
| | | | | 82 | 5 | 80 | 12 | BROWN TAIL LIGHT CONNECTOR-42 | TAIL LIGHT | LEFT FLASHING+, RIGHT ON STEADY |
| IT AHEAD | | | | | | | | | | |
| -16 | 12 | 62 | 5 | 70 | 5 | 68 | 12 | YELLOW LEFT TURN CONNECTOR-36 | LEFT TURN SIGNAL | OFF |
| -26 | 12 | 66 | 5 | 78 | 5 | 76 | 12 | GREEN RIGHT TURN CONNECTOR-40 | RIGHT TURN SIGNAL | OFF |
| | | | | | | | | | HAZARD LIGHTS | ON |
| | | | | 74 | 5 | 72 | 12 | RED BRAKE CONNECTOR-38 | BRAKE LIGHT | ON |
| | | | | 82 | 5 | 80 | 12 | BROWN TAIL LIGHT CONNECTOR-42 | TAIL LIGHT | ON |
| VEHICLE BRAKING WHILE TURNING LEFT | | | | | | | | | | |
| YELLOW LEFT TURN CONNECTOR-16 | 12 FLASHING | 62 | 5 FLASHING | 70 | 5 FLASHING | 68 | 12 FLASHING | YELLOW LEFT TURN CONNECTOR-36 | LEFT TURN SIGNAL | FLASHING+ |
| GREEN RIGHT TURN CONNECTOR-26 | 12 | 66 | 5 | 78 | 5 | 76 | 12 | GREEN RIGHT TURN CONNECTOR-40 | RIGHT TURN SIGNAL | FLASHING |
| | | | | | | | | | HAZARD LIGHTS | LEFT ON FLASHING+; RIGHT ON |
| | | 100 | >2 | 74 | 5 | 72 | 12 | RED BRAKE CONNECTOR-38 | BRAKE LIGHT | ON |
| | | | | 82 | 5 | 80 | 12 | BROWN TAIL LIGHT CONNECTOR-42 | TAIL LIGHT | ON |
| VEHICLE STATIONARY WITH HAZARD LIGHTS ON | | | | | | | | | | |
| YELLOW LEFT TURN CONNECTOR-16 | 2.5 | 62 | 5 | 70 | 5 | 68 | 12 | YELLOW LEFT TURN CONNECTOR-36 | LEFT TURN SIGNAL | OFF |
| GREEN RIGHT TURN CONNECTOR-26 | 2.5 | 66 | 5 | 78 | 5 | 76 | 12 | GREEN RIGHT TURN CONNECTOR-40 | RIGHT TURN SIGNAL | OFF |
| | | | | | | | | | HAZARD LIGHTS | ON |
| | | 100 | <2 | 74 | 0 | 72 | 0 | RED BRAKE CONNECTOR-38 | BRAKE LIGHT | OFF |
| | | | | 82 | 5 | 80 | 12 | BROWN TAIL LIGHT CONNECTOR-42 | TAIL LIGHT | ON |

FIG. 9

TRAILER SYSTEM AND METHOD FOR MODULATING SIGNALS FROM A VEHICLE TO A TRAILER

TECHNICAL FIELD

The disclosed embodiments relate generally to a system and method for modulating signals from a vehicle to a trailer and, in particular, to providing a trailer wiring harness system that receives lighting signals from a SAE J2863 vehicle output and converts them for use by an ASABE S279 trailer input to properly operate the lights on the trailer using outputs from the vehicle.

BACKGROUND

In an agricultural environment, it is often desirable to tow agricultural equipment, such as anhydrous ammonia trailers, on the highway using typical road vehicles, such as pickup trucks. Many anhydrous ammonia providers do not have agricultural towing vehicles in their inventory. Pickup trucks increase efficiency by pulling agricultural equipment along the highway faster than they can be pulled with a tractor or similar agricultural vehicle.

One downside to using a pickup truck to tow agricultural equipment is that road vehicles typically have a road trailer vehicle lighting connector, such as a seven-pin connector meeting the SAE International J2863 standard, whereas agricultural equipment, such as anhydrous ammonia trailers, typically have an agricultural vehicle lighting connector, such as a seven-pin connector meeting the American Society of Agricultural and Biological Engineers (ASABE) S279 standard. Unfortunately, not only are the SAE International J2863 standard and ASABE S279 standard directly incompatible with one another, they are not even capable of full compatibility with a supplemental wiring harness that merely routes the wires on the vehicle to their associated function on the trailer.

It would therefore be desirable to provide a system and method for coupling a lighting connector of a vehicle to the lighting connector of agricultural equipment using a central processing unit (CPU) that receives signals from the vehicle, processes those signals, and, in response, activates the appropriate light on the trailer. One downside to such a system is that the voltage associated with a lighting connector of a vehicle is enough to damage many CPUs. It would therefore be desirable to provide a system and method for coupling a lighting connector of a vehicle to the lighting connector of agricultural equipment using a low-voltage CPU in a manner that does not damage the CPU.

SUMMARY OF THE DISCLOSED SUBJECT MATTER

To overcome the limitations in the prior art described above, and to overcome other limitations that will become apparent upon reading and understanding the present specification, the present application discloses a method, apparatus, and article of manufacture for coupling a lighting connector of a vehicle to the lighting connector of agricultural equipment. A conversion harness has a female vehicle connector and a male tractor connector coupled to relays that step down the voltage output of lighting signals emanating from the vehicle, route the stepped down voltage to a CPU for processing, and then route and step up the voltage output of the CPU to properly light the agricultural equipment in response to output from the vehicle, such as in response to stepping on the vehicle's brakes or actuating the vehicle's turn signal.

Other implementations of trailer lighting actuation are disclosed, including implementations directed to actuating trailer brake lights in response to a voltage change of the vehicle brake signal output.

BRIEF DESCRIPTION OF THE DRAWINGS

The present invention will now be described, by way of example, with reference to the accompanying drawings in which:

FIG. 9 is a chart showing the voltage measured at various points in the harness when the vehicle is in various states.

DETAILED DESCRIPTION OF THE DRAWINGS

The system of the present invention transmits lighting signals from a vehicle to agricultural equipment being towed by the vehicle. The system uses an improved wiring harness to convert output from a standard 7-pin vehicle connector to activate agricultural equipment lights through a standard 7-pin agricultural equipment lighting connector. The system steps down the voltage output from the vehicle connector, passes the stepped-down signal through a central processing unit to determine the correct output, steps the voltage back up, and directs the stepped-up signal to actuate the appropriate lights on the agricultural vehicle.

Figure 1:
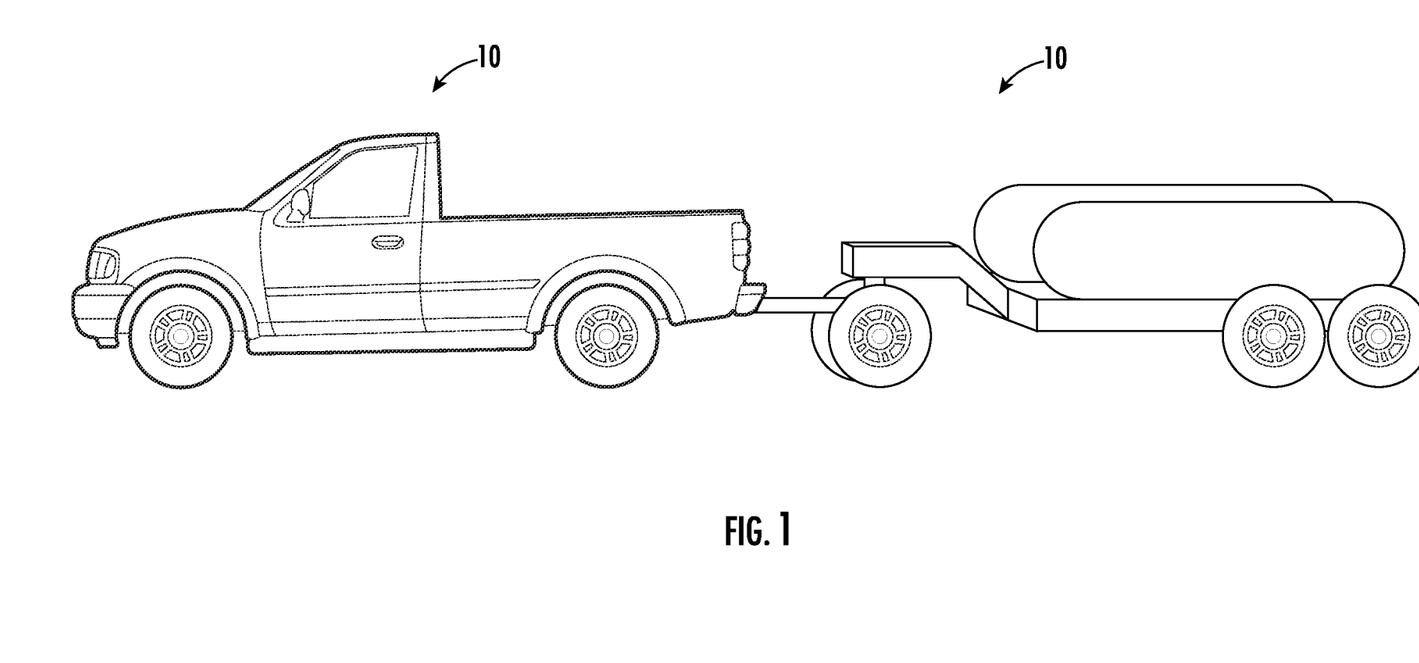
FIG. 1 illustrates a side elevation of a vehicle and trailer equipped with the harness system in accordance with one embodiment.

As shown in FIG. 1, a powered wheeled vehicle, such as a pickup truck 10, is shown mechanically and releasably coupled to agricultural equipment, such as an anhydrous ammonia tank trailer 12, in a manner such as that known in the art. While only a single anhydrous ammonia tank trailer 12 will be shown and described, it should be noted that any desired number of agricultural equipment may be coupled to the truck 10.

Figure 2:
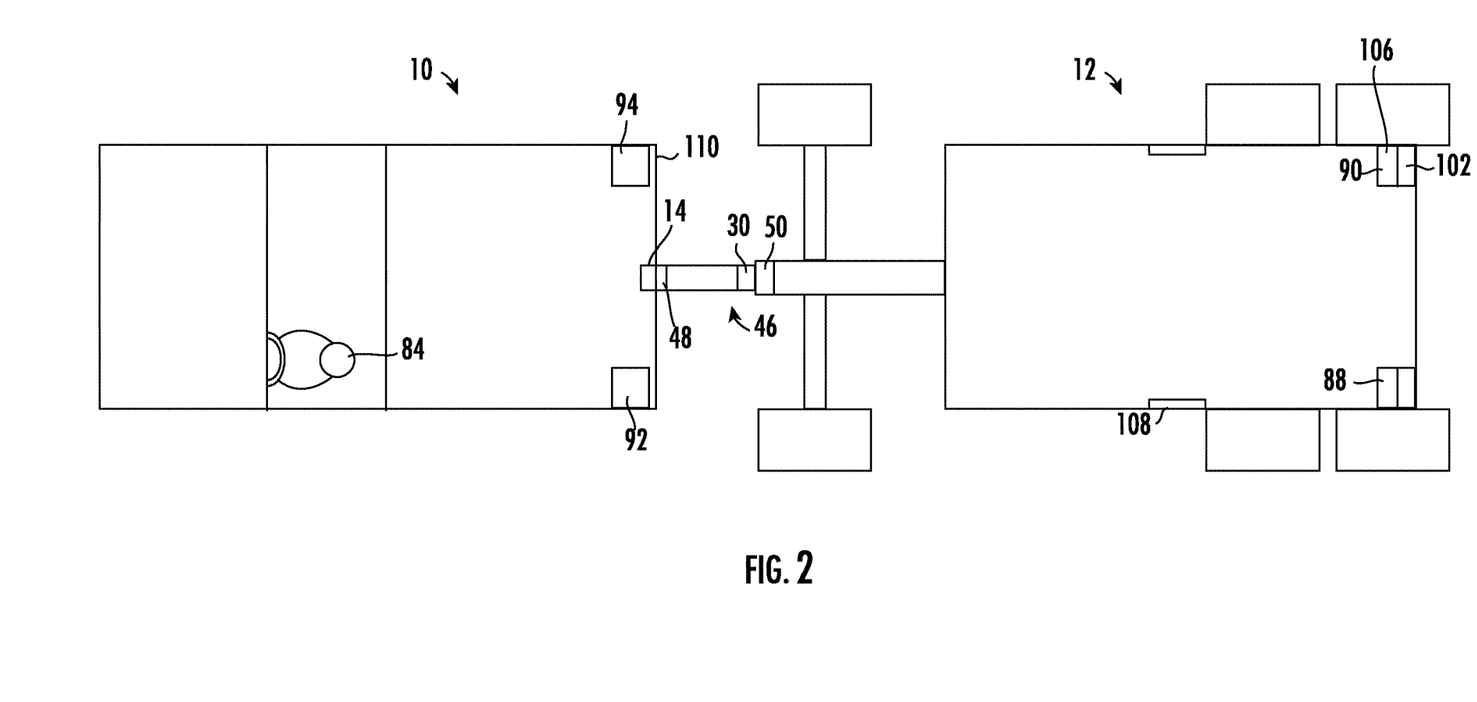
FIG. 2 illustrates a top elevation of the vehicle and trailer of FIG. 1.
Figure 3:
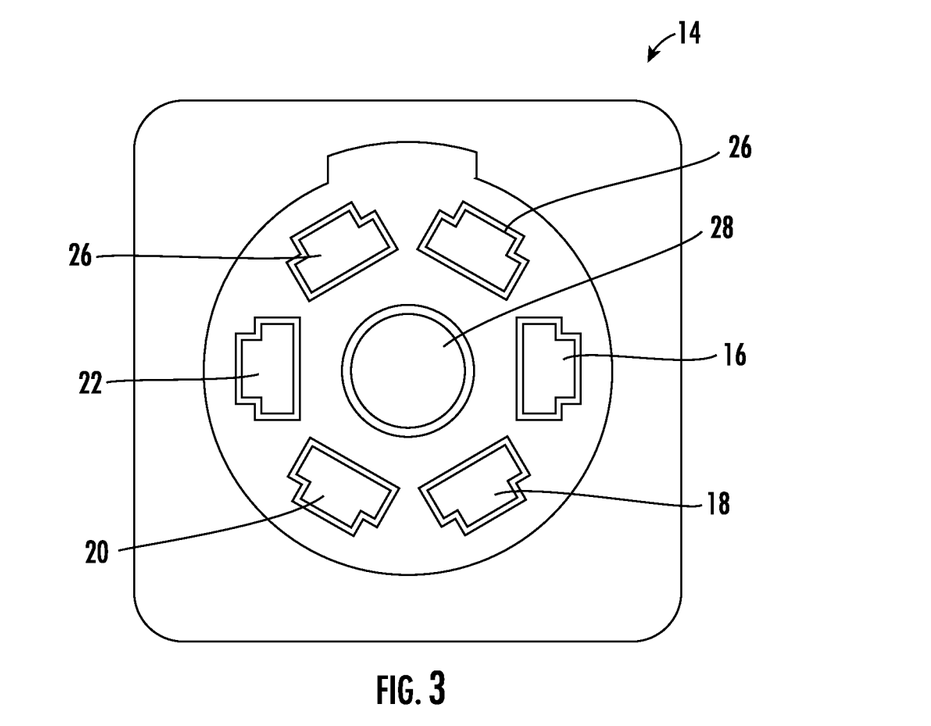
FIG. 3 illustrates a front elevation of a vehicle connector in accordance with one embodiment.

As shown in FIGS. 2-3, the truck 10 is provided with male 7-way recreational vehicle connector 14 such as those known in the art. The vehicle connector 14 preferably meets the SAE J2863 standard, being wired with a yellow male left turn connector 16, a white male ground connector 18, a blue male brake connector 20, a green male right turn connector 22, an orange male power connector 24, a brown male running lights connector 26, and a grey male reverse lights connector 28.

Figure 4:
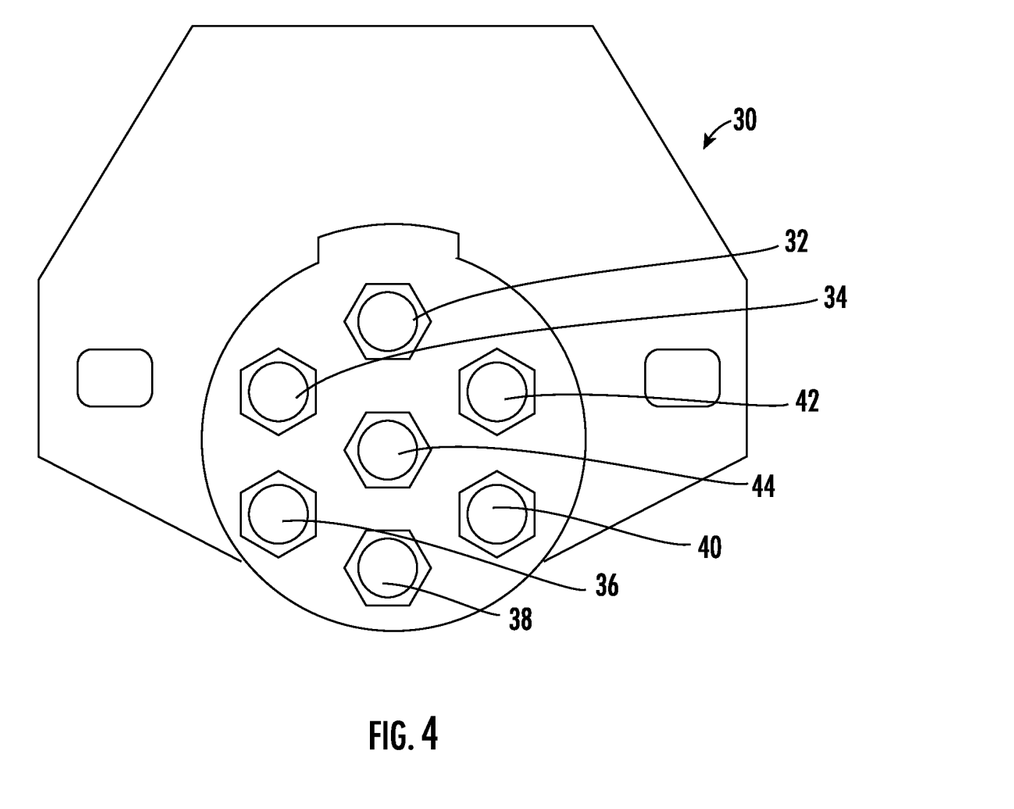
FIG. 4 illustrates a front elevation of an agricultural connector in accordance with one embodiment.

As shown in FIGS. 2 and 4, the trailer 12 is provided with female 7-way agricultural trailer connector 30 such as those known in the art. The trailer connector 30 preferably meets the ASABE S279 standard, being wired with a white female ground connector 32, a black female work lamps connector 34, a yellow female left turn/hazard connector 36, a red female brake connector 38, a green female right turn/hazard connector 40, a brown female tail connector 42, and a blue female power connector 44. While in the preferred embodiment the vehicle connector 14 is a blade connector and the trailer connector 30 is a pin connector, the connectors 14 and 30 may be provided with any type of connector known in the art.

Figure 5:
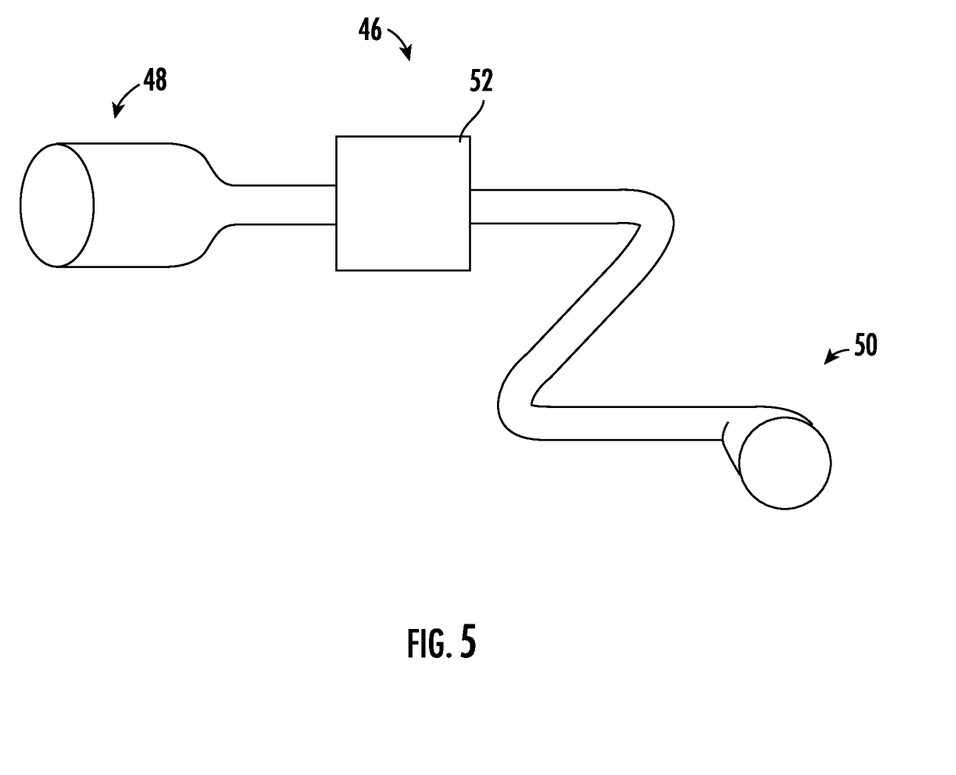
FIG. 5 illustrates a perspective view of the improved harness of a harness system in accordance with one embodiment.

As shown in FIG. 5, a harness 46 is provided with a female 7-way recreational vehicle connector 48 preferably meeting the SAE J2863 standard and capable of fitting into releasable mating engagement with the vehicle connector 14. The harness 46 is also provided with a male 7-way agricultural equipment connector 50, preferably meeting the ASABE S279 standard and capable of fitting into releasable mating engagement with the trailer connector 30. The vehicle connector 48 and agricultural equipment connector 50 are coupled to a sealed weather and shock resistant plastic housing 52.

Figure 6:
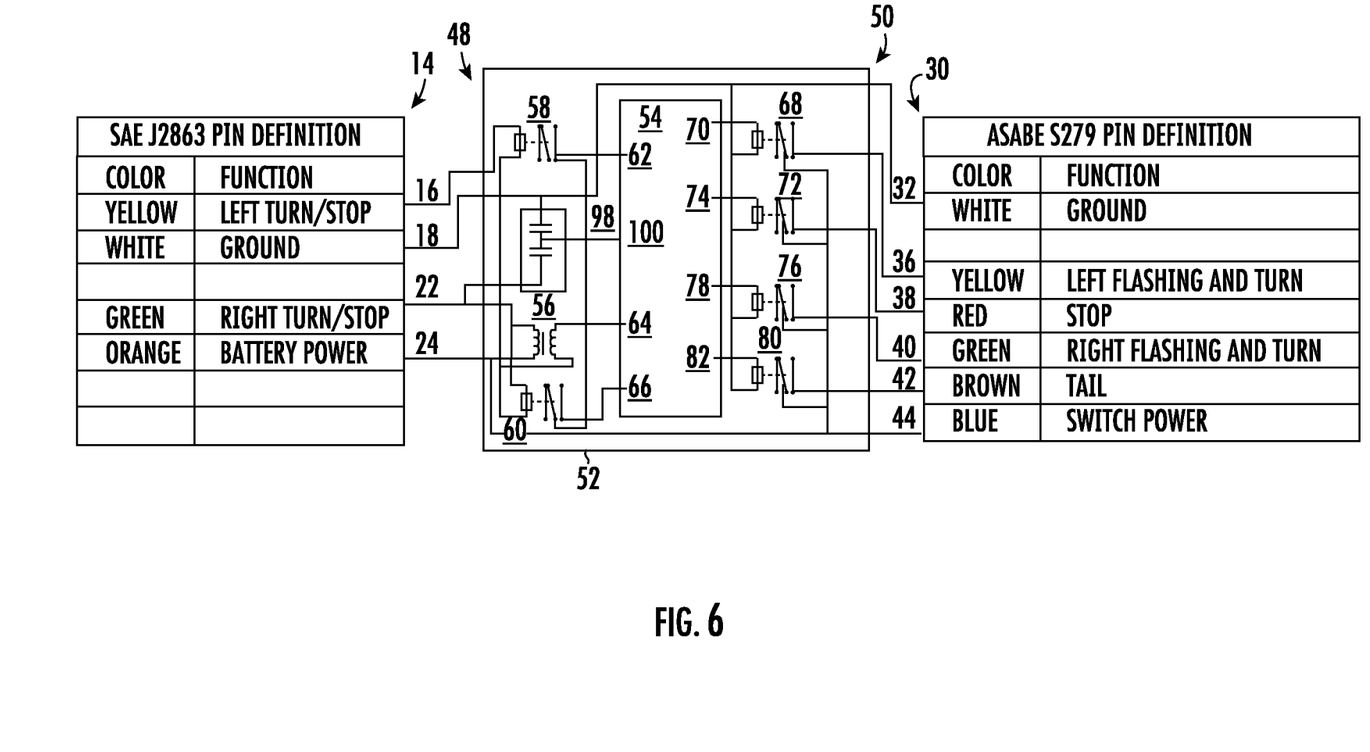
FIG. 6 illustrates a schematic of a wiring system of an improved harness of a harness system in accordance with one embodiment.

As shown in FIG. 6, the harness 46 connects the battery connector 24 of the vehicle with a relay 58. The orange connector 24 provides 12-volt power to the relays and the blue connector 44 of the male harness connector 50. Coupled to the relay 58 is transformer 56. The transformer 56 and relay 58 either raise the voltage coming from the left turn connector 16 from 2.5 volts to 5 volts or reduce the voltage from 12 volts down to 5 volts, so that regardless of the input voltage, the output voltage from the relay 58 is 5 volts. The transformer 56 and relay 58 are preferably integrated into a central processing unit 54 and change the input voltage received from connector 16 to the preferred input voltage of the central processing unit 54 which in a preferred embodiment is 5 volts. Depending on the type of central processing unit used, the output voltage may be any predetermined voltage between 2-8 volts.

As shown in FIG. 6, the central processing unit 54, such as a Raspberry Pi 4 single-board central processing unit developed by Raspberry Pi Trading and operating on the Raspberry Pi OS, is secured within the housing 52 of the harness 46. A voltage sensor 98 is preferably integrated into the central processing unit 54 in a manner known in the art. Alternatively, any known type of voltage sensor, such as a capacitor-type or resistive-type, may be used. The harness 46 connects the left turn connector 16 of the vehicle 10 with a relay 58. The harness 46 also connects the right turn connector 22 to relay 60. The relays 58 and 60, transformer 56, and voltage sensor 98 are coupled to inputs 62, 66, 64, and 100, respectively, of the central processing unit 54 and modify the input voltage received by the central processing unit 54 to 5 volts.

Similarly, as shown in FIG. 6, the harness 46 connects the left turn connector 36 of the trailer with a relay 68 which changes the voltage coming from an output 70 of the central processing unit 54. The relay 68 is preferably integrated into the central processing unit 54 and changes the output voltage of the central processing unit 54 to—12 volts, as desired, as explained below. The harness 46 connects brake connector 38 of the trailer 12 with a relay 72. The relay 72 is coupled to an output 74 of the central processing unit 54. The harness 46 connects right turn connector-40 of the trailer 12 with a relay 76. The relay 76 is coupled to an output 78 of the central processing unit 54. The harness 46 also couples the tail connector 42 with a relay 80. The relay 80 is coupled to an output 82 of the central processing unit 54. The harness 46 couples the ground connector 18 of the vehicle 10 with the transformer 56, relays 58, 60, 68, 72, 76, and 80, and to the ground connector 32 of the trailer 12. The harness 46 also couples the battery connector 24 of the vehicle 10 with relays 68, 72, 76, and 80 and to the power connector 44 of the trailer 12. The relays 68, 72, 76, and 80 are coupled to outputs 70, 74, 78, and 82, respectively, of the central processing unit 54 and modify the output voltage of the central processing unit 54 from 5 volts to 12 volts, as explained below.

As shown in FIG. 6, the electrical power for a central processing unit 54 and all output to the trailer 12 passing through the male connector 50 comes from the battery connector 24. The battery connector 24 supplies voltage to the transformer 56 and the relays 58 and 60 directing signals to the central processing unit 54. The transformer 56 modifies to 5 volts all signals passing from the vehicle 10 through the female harness connector 48 to the central processing unit 54. The battery connector 24 also supplies the power, at 12 volts, controlled by relays 68, 72, 76, and 80, for the output from the central processing unit 54 and to the switched power connector 44, on the agriculture trailer 12.

Figure 7:
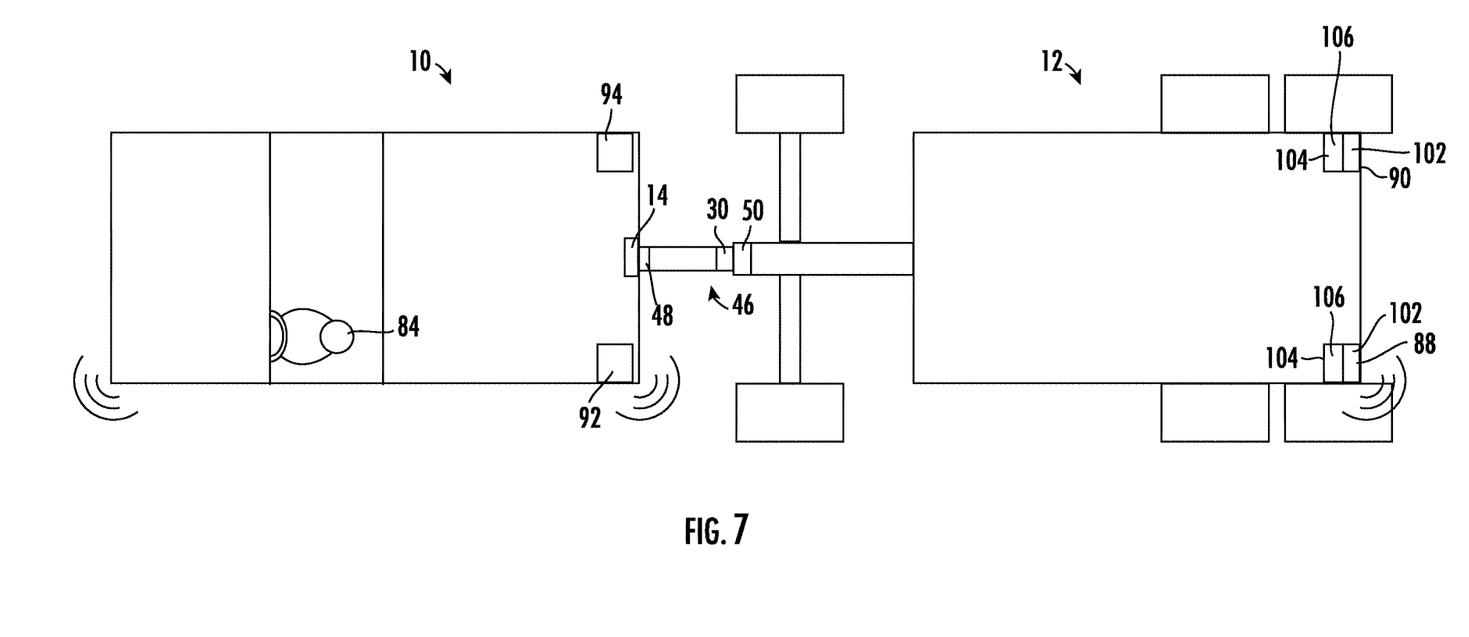
FIG. 7 illustrates a top elevation of the tractor and trailer of FIG. 1 shown with the left turn signal on the vehicle and trailer actuated.

To use the harness 46, an operator 84 secures the trailer 12 to the vehicle, the harness female connector 48 to the vehicle connector 14, and the harness male connector 50 to the trailer connector 30. As shown in FIGS. 7 and 9, as the operator 84 drives the vehicle 10, the vehicle 10 sends 2.5-volt signals to both the left turn connector 16 and right turn connector 22 of the vehicle connector 14. No current is provided through the blue brake connector 20. The harness 46 converts the signals to 5 volts as explained above, with the 5-volt signals being received by inputs 62 and 66. In this state, input 100 does not receive a signal above 2 volts. In response, the central processing unit 56 sends a 5-volt signal through outputs 70, 78, and 82, sending no signal through output 74. The relays 68, 72, and 80 convert this output to 12-volts signal sent to left turn connector 36, right turn connector 40, tail connector 42. No signal is sent to brake connector 38. This results in the trailer hazard lights 102 flashing, the trailer tail lights 104 being on, and the trailer left turn signal 88, right turn signal 90, trailer brake lights 106 being off. The orange battery connector 24 provides 12-volt power to the relays and the blue power connector 44. (FIGS. 3-4). The white ground connector 18 is coupled as a ground to all components needing a ground, in a manner known in the art. As shown in FIG. 6, nothing in this embodiment is coupled to the electric brakes connector 20, the running lights connector 26, the reverse lights connector 28, and the work lamps connector 34 as electric brakes, running lights, reverse lights, and work lamps on the trailer 12 are not actuated in the preferred embodiment. If desired, these functions could be added to an embodiment of the invention in a manner known in the art.

As the operation of the vehicle connector 14 during a left turn is similar, albeit a mirror, of the operation of the vehicle connector 14 during a right turn, description will be limited to the left turn operation of the vehicle connector 14. When the operator 84 actuates the left turn signal 92 on the vehicle 10, the vehicle 10 sends a 2.5-volt signal to the right turn connector 22 and a pulsed 2.5-volt signal to the left turn connector 16 of the vehicle connector 14 in a manner known in the art. No current is provided through the blue brake connector 20. The harness 46 converts the signals to 5 volts as explained above, with the 5-volt signals being received by inputs 62, 64, and 66, with input 64 receiving a pulsed 5-volt signal. In this state, input 100 does not receive a signal above 2 volts. In response, the central processing unit 56 sends a 5-volt signal through outputs 70, 78, and 82, with the signal sent through output 70 being a pulsed signal. No signal is sent through output 74. The relays 68, 78, and 80 convert the output to 12-volt signals sent to the left turn connector 36, right turn connector 40, tail connector 42, and power connector 44, with the signal sent to the left turn connector 36 being pulsed at the faster rate indicated above. No signal is sent to brake connector 38. The operation of the hazard lights and the turn signal lights is controlled by an electronic module (not shown) such as that known in the art. Receipt of the signal by the left turn connector 36, right turn connector 40, tail connector 42, and power connector 44 causes the electronic module to cause the left turn signal 88 to flash faster, preferably flashing 80-105 flashes per minute, more preferably flashing about 20 flashes per minute faster (indicated as "Flashing+" in FIG. 9) than the trailer hazard lights' 102 normal flashing rate of 60-85 flashes per minute. This results in the trailer hazard lights 102 flashing on the left side, while remaining on but not flashing on the right side. The trailer tail lights 104 are also flashing quickly on the left side, while remaining on but not flashing on the right side. The trailer left turn signal 88 is flashing quickly, while the trailer right turn signal 90 remains on but not flashing.

When the operator 84 actuates the right turn signal 94 on the vehicle 10, the vehicle 10 sends a 2.5-volt signal to the left turn connector 16 and a pulsed 2.5-volt signal to the right turn connector 22 of the vehicle connector 14 in a manner known in the art. No current is provided through the blue brake connector 20. The harness 46 converts the signals to 5 volts as explained above, with the 5-volt signals being received by inputs 62, 64, and 66, with input 66 receiving a pulsed 5-volt signal. In this state, input 100 does not receive a signal above 2 volts. In response, the central processing unit 56 sends a 5-volt signal through outputs 70, 78, and 82, with the signal sent through output 78 being a pulsed signal. No signal is sent through output 74. The relays 68, 78, and 80 convert this output to 12-volt signals sent to the left turn connector 36, right turn connector 40, tail connector 42, and power connector 44, with the signal sent to the right turn connector 40 being pulsed at the faster rate. No signal is sent to the brake connector 38. Receipt of the signal by the left turn connector 36, right turn connector 40, tail connector 42, and power connector 44 causes the electronic module to cause the right turn signal 90 to flash faster, preferably flashing 80-105 flashes per minute, more preferably flashing about 20 flashes per minute faster (indicated as "Flashing+" in FIG. 9) than the trailer hazard lights' 102 normal flashing rate of 60-85 flashes per minute. This results in the trailer hazard lights 102 flashing on the right side, while remaining on but not flashing on the left side. The trailer tail lights 104 are also flashing quickly on the right side, while remaining on but not flashing on the left side. The trailer right turn signal 90 is flashing quickly, while the trailer left turn signal 88 remains on but not flashing.

Figure 8:
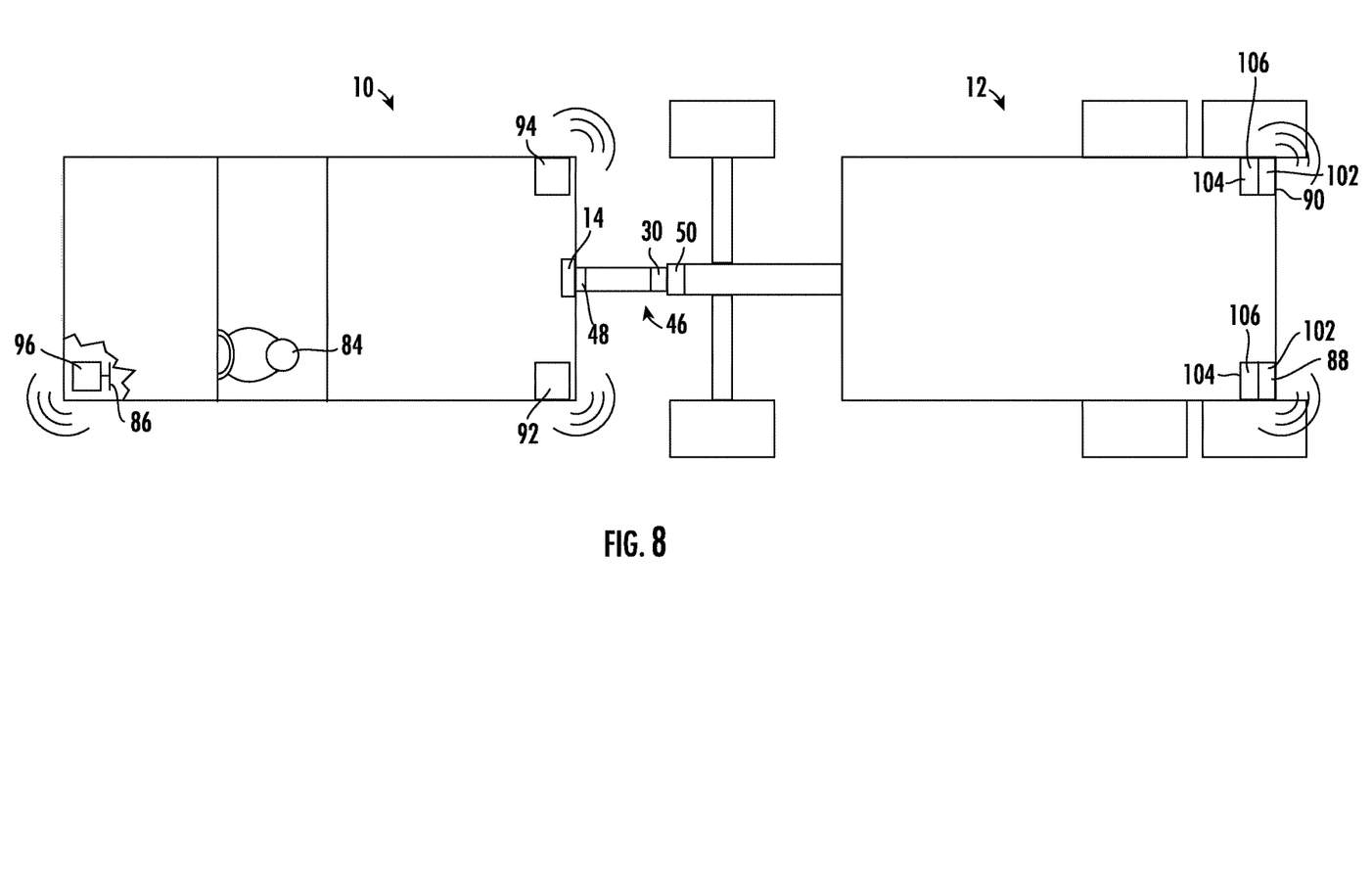
FIG. 8 illustrates a top elevation of the tractor and trailer of FIG. 1 shown with the brake lights on the vehicle and trailer actuated.

When the operator 84 actuates the brake pedal 86 to actuate the brake controller 96 on the vehicle 10, the vehicle 10 sends a 12-volt signal to the left turn connector 16 and right turn connector 22 of the vehicle connector 14 in a manner known in the art. No current is used by the harness 46 from the blue brake connector 20. The harness 46 converts the 12-volt signal from the left turn connector 16 and right turn connector 22 to 5 volts as explained above, with the 5-volt signals being received by inputs 62, 64, and 66. In this state, input 100 receives a signal above 2 volts, preferably 5 volts. In response, the central processing unit 56 sends a 5-volt signal through outputs 70, 74, 78, and 82. The relays 68, 72, 78, and 80 convert this output to 12-volt signals sent to the left turn connector 36, brake connector 38, right turn connector 40, and tail connector 42. This results in the trailer brake lights 106 being on and the trailer hazard lights 102 flashing on both the left and right. The trailer tail lights 104 are also on, while the trailer left turn signal 88 and left turn signal 90 are off.

When the operator 84 actuates the brake pedal 86 and the left turn signal 92 of the vehicle 10, the result is similar to that described above in relation to actuation of the left turn signal 92 alone, except that the vehicle 10 sends a pulsed 12-volt signal to the left turn connector 16 of the vehicle connector 14, causing the input 100 to receive an input greater than 2 volts, preferably 5 volts. As shown in FIG. 9, this causes the central processing unit 54 to trigger the tail light 104 of the trailer 12 to be on, the right hazard light 102, right turn signal 90 and the brake lights of the trailer 12 to be on, and the left hazard light 102 and left turn signal 92 of the trailer 12 to flash faster, preferably at least 20 cycles per minute faster.

When the operator 84 actuates the lights 110 on the vehicle 10, the vehicle 10 sends 2.5-volt signals to the left turn connector 16 and right turn connector 22 of the vehicle connector 14 in a manner known in the art. No current is provided through the blue brake connector 20. The harness 46 converts the signals to 5-volt signals as explained above, with the 5-volt signals being received by inputs 62, 64 and 66. In this state, input 100 does not receive a signal above 2 volts. In response, the central processing unit 56 sends a 5-volt signal through output 82, pulsed 5-volt signals through outputs 70 and 78, and no signal through output 74. The relays 68, 72, 78, and 80 convert this output to 12-volt signals being sent to the left turn connector 36, right turn connector 40, tail connector 42, and power connector, with the signal sent to the left turn connector 36 and right turn connector 40 being pulsed. No signal is sent to the brake connector 38. This results in the trailer hazard lights 102 flashing on the right side and left side and the tail lights 104 to be on. The trailer left turn signal 88, right turn signal 90, and brake lights 106 remain off.

Although the invention has been described with respect to a preferred embodiment thereof, it is to be understood that it is not to be so limited since changes and modifications can be made therein which are within the full, intended scope of this invention as defined by the appended claims.

What is claimed is:

1. An electronic signal conversion module for coupling a vehicle to a trailer having a left turn signal light, a right turn signal light, a brake light, and a running light, the module comprising:
    a female seven pin connector comprising:
        a female left turn connector;
        a female right turn connector;
        a female ground connector;
        a female power connector; and
        a female brake connector;
    a male seven pin connector comprising:
        a male left turn connector;
        a male right turn connector;
        a male ground connector,
        a male power connector;
        a male brake connector; and
        a male tail lights connector;
    a voltage sensor coupled to the female brake connector; and a processor coupled to the voltage sensor, wherein the processor is configured to send sufficient power to the male brake connector to activate the trailer brake light when the voltage sensor detects the voltage received from the female left turn connector exceeds a predetermined voltage and to stop sending sufficient power to the male brake connector to activate the trailer brake light when the voltage sensor detects the voltage received from the female left turn connector falls below the predetermined voltage.

2. The electronic signal conversion module of claim 1, wherein the processor is located between the female seven pin connector and the male seven pin connector.

3. The electronic signal conversion module of claim 1, wherein the female seven pin connector is a SAE Standard J2863 connector.

4. The electronic signal conversion module of claim 3, wherein the male seven pin connector is an ASABE Standard S279 connector.

5. The electronic signal conversion module of claim 1, wherein the male seven pin connector is an ASABE Standard S279 connector.

6. The electronic signal conversion module of claim 1, further comprising a first electronic power convertor coupled between the female seven pin connector and the processor and a second electronic power convertor coupled between the processor and the male seven pin connector.

7. The electronic signal conversion module of claim 6, wherein the first electronic power convertor is a transformer.

8. An electronic signal conversion module for coupling a vehicle to a trailer having a left turn signal light, a right turn signal light, a brake light, and a running light, the module comprising:
- a female seven pin connector comprising:
  - a female left turn connector;
  - a female right turn connector;
  - a female ground connector;
  - a female power connector; and
  - a female brake connector;
- a male seven pin connector comprising:
  - a male left turn connector;
  - a male right turn connector;
  - a male ground connector;
  - a male power connector;
  - a male brake connector; and
  - a male tail lights connector;
- a processor coupled to the voltage sensor, wherein the processor is configured to send sufficient power to the male brake connector to activate the trailer brake light in response to a predetermined input from the female seven pin connector;
- a first electronic power convertor coupled between the female seven pin connector and the processor and a second electronic power convertor coupled between the processor and the male seven pin connector; and
- wherein the first electronic power convertor is configured to step down a voltage received from the female seven pin connector and send a stepped down voltage to the processor in response to receiving a predetermined voltage from the female seven pin connector;
- wherein the second electronic power convertor is configured to step up a voltage received from processor and send a stepped up voltage to the male seven pin connector in response to receiving the predetermined voltage from the female seven pin connector.

9. The electronic signal conversion module of claim 8, wherein the voltage received from the female seven pin connector is between 11 and 13 volts and wherein the stepped down voltage is at least 2 volts and no more than 8 volts processor is located between the female seven pin connector and the male seven pin connector.

10. The electronic signal conversion module of claim 9, wherein the processor is powered by between 2 and 8 volts.

11. The electronic signal conversion module of claim 8, wherein the processor is located between the female seven pin connector and the male seven pin connector.

12. The electronic signal conversion module of claim 8, wherein the female seven pin connector is a SAE Standard J2863 connector.

13. The electronic signal conversion module of claim 8, wherein the male seven pin connector is an ASABE Standard S279 connector.

14. The electronic signal conversion module of claim 8, wherein the male seven pin connector is an ASABE Standard S279 connector.

15. The electronic signal conversion module of claim 8, wherein the first electronic power convertor is a transformer.

16. A method for activating a turn signal and a brake light on a trailer in response to output from a vehicle, the method comprising:
- providing an electronic signal conversion module for coupling a vehicle to a trailer having a left turn signal light, a right turn signal light, a brake light, and a running light, the module comprising:
  - a female seven pin connector comprising:
    - a female left turn connector;
    - a female right turn connector;
    - a female ground connector;
    - a female power connector; and
    - a female brake connector;
  - a male seven pin connector comprising:
    - a male left turn connector;
    - a male right turn connector;
    - a male ground connector;
    - a male power connector;
    - a male brake connector; and
    - a male tail lights connector; and
  - a voltage sensor coupled to the female brake connector;
- in response to a left turn signal on the vehicle being activated, sending a voltage below a predetermined voltage from the female left turn connector to the voltage sensor;
- in response to the voltage sensor receiving the voltage below the predetermined voltage from the female left turn connector, activating the left turn signal on the trailer and not activating the brake light on the trailer; and
- in response to a brake on the vehicle being activated, sending a voltage above the predetermined voltage from the female left turn connector to the voltage sensor; and
- in response to the voltage sensor receiving the voltage above the predetermined voltage from the female left turn connector, activating the brake light on the trailer.

17. The method of claim 16, wherein the female seven pin connector is a SAE Standard J2863 connector.

18. The method of claim 16, wherein the male seven pin connector is an ASABE Standard S279 connector.

19. The method of claim 16, further comprising coupling a processor between the female seven pin connector and the male seven pin connector.

20. The method of claim 19, further comprising coupling a first electronic power convertor between the female seven pin connector and the processor and a second electronic power convertor coupled between the processor and the male seven pin connector.

\* \* \* \* \*